United States Patent [19]
Kalen

[11] 3,795,956
[45] Mar. 12, 1974

[54] BURNISHING TOOL FOR AN ARCUATE SURFACE

[75] Inventor: Stuart E. Kalen, Sterling Heights, Mich.

[73] Assignee: Cogsdill Tool Products, Inc., Farmington, Mich.

[22] Filed: Nov. 10, 1972

[21] Appl. No.: 305,457

[52] U.S. Cl. .................. 29/90, 51/170 T, 72/76
[51] Int. Cl. ... B21c 37/30, B24b 23/00, B21b 13/20
[58] Field of Search ............ 29/90; 51/170 T; 72/76

[56] References Cited
UNITED STATES PATENTS

| | | | |
|---|---|---|---|
| 2,232,843 | 2/1941 | Drissner et al. | 29/90 |
| 3,494,013 | 2/1970 | Gottschald | 29/90 |
| 3,140,529 | 7/1964 | Rozentals | 29/90 |
| 1,501,690 | 7/1924 | Strong | 29/90 |
| 1,441,893 | 1/1923 | Timken | 29/90 |
| 1,312,333 | 8/1919 | Lebow | 29/90 |
| 1,516,269 | 11/1924 | Drissner | 29/90 |
| 1,122,433 | 12/1914 | Smith | 29/90 |
| 2,993,311 | 7/1961 | West | 51/170 T |
| 3,194,042 | 7/1965 | Adam | 72/76 |

FOREIGN PATENTS OR APPLICATIONS

| | | | |
|---|---|---|---|
| 243,432 | 9/1969 | U.S.S.R. | 29/90 |
| 261,940 | 5/1970 | U.S.S.R. | 29/90 |
| 678,070 | 12/1929 | France | 29/90 |
| 692,468 | 6/1940 | Germany | 29/90 |

Primary Examiner—Harrison L. Hinson
Attorney, Agent, or Firm—Harness, Dickey & Pierce

[57] ABSTRACT

A shank for a burnishing tool has a universal drive joint with a head which contains rollers engaged with a truncated conical surface at the end of the head. A spherical workpiece which may be a ball on a stud is drivenly supported with the axis of the stud disposed at an angle to the axis of the burnishing tool shank which is also driven, the drives being in opposite directions. The rollers have a point contact with the arcuate surface and the crossed axis relation of the driven spindles producing the spreading of the points of engagement so that the entire surface of the workpiece to be burnished will be highly polished in a very short time.

10 Claims, 3 Drawing Figures

BURNISHING TOOL FOR AN ARCUATE SURFACE

BACKGROUND OF THE INVENTION

Reference may be had to J. E. Gustkey, U.S. Pat. No. 3,444,714 issued May 20, 1969 and that to W. G. Huber et al., Pat. No. 3,320,652, issued May 23, 1967 to show prior art for burnishing tools.

RELATED APPLICATION

Reference may be had to S. E. Kalen application Ser. No. 305,458, filed Nov. 10, 1972, for "BURNISHING TOOL FOR A FLAT SURFACE" and to S. E. Kalen, application Ser. No. 182,360, filed Sept. 21, 1971 for "FINISHING DEVICE FOR INTERNAL AND EXTERNAL SURFACES," which were assigned to the assignee of the present invention.

SUMMARY OF THE INVENTION

The invention pertains to a burnishing tool in the nature of a device in which a spindle is driven in rotation with a burnishing head universally supported thereon containing a plurality of rollers disposed on a truncated conical surface within the end face of the head. A second driven spindle is provided for the workpiece the axis of which is disposed at an angle to the axis of the tool spindle which causes the point engagement between the arcuate surface of the workpiece and the rollers to spread over the entire surface to be burnished to provide a highly polished and a true arcuate surface thereon. The spindle of the workpiece and the tool are driven in opposite directions and the point engagements between the rollers and the arcuate surface are spread over the entire ara to be burnished. In one form of the invention herein illustrated, the arcuate surface is not a uniform one and the workpiece spindle is swung in an arc to advance the workpiece surface relative to the rollers to have all portions thereof uniformly burnished.

DESCRIPTION OF THE PREFERRED EMBODIMENTS

Figure 1:
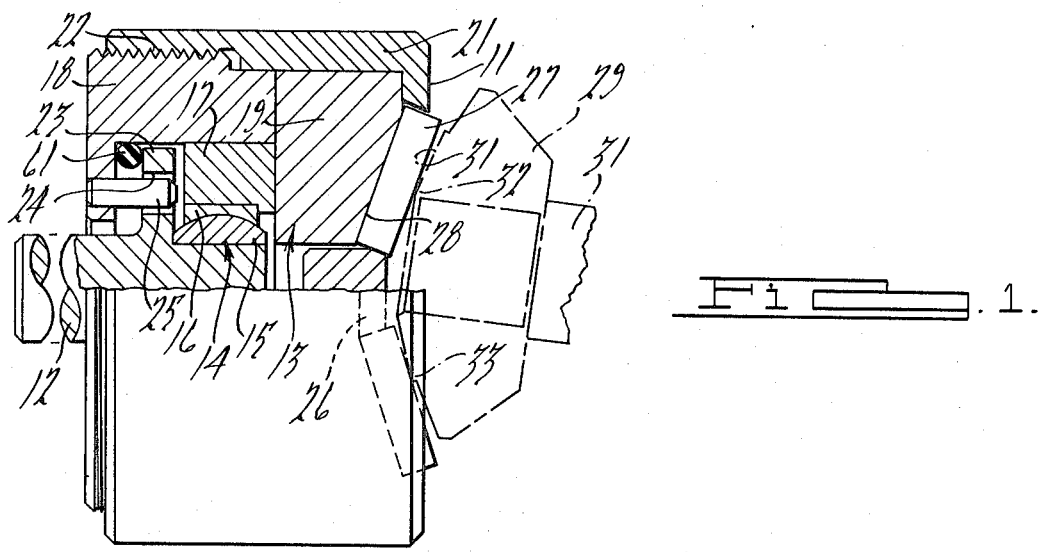
FIG. 1 is a broken view with a part in section showing a head having rollers disposed in a truncated conical plane for burnishing an arcuate face of a blank for a pinion gear.

A burnishing tool 11 as illustrated in FIG. 1, has a spindle 12 and a head 13 supported on the end of the spindle by a universal drive 14. The universal drive embodies a bearing having a hollow ball section 15 mounted within a concave ring 16 secured within a bushing 17 which is fixed within a housing 18. A roller cam 19 is supported by a retainer 21 against the housing 18 when secured thereto by a threaded connection 22. The spindle 12 has a flange 23 extending outwardly thereof within the housing 18 having an aperture 24 into which a fixed pin 25 in the housing 18 extends. As the spindle 12 is driven in rotation, the pin 25 is driven therewith to drive the housing 18, retainer 21 and the roller cam 19.

A cage 26 supports a plurality of rollers 27 in engagement with a flat truncated conical surface 28 on which the rollers roll. A workpiece 29, herein illustrated as a blank for a pinion gear, is mounted on a spindle 31 with its axis disposed in crossed relation, that is to say, disposed at an angle to the axis of the spindle 12. The spindles are supported in driving heads which produce the rotation thereof rotating the workpiece 29 in one direction and the head 13 in the opposite direction. It will be noted that the one roller engages the spherical surface 31 at an inner point 32 and that the opposite roller engages the surface at the outer point 33. As the relative rotation between the head 13 and workpiece 29 occurs, the point engagement 32 moves outwardly while the point engagement 33 moves inwardly to cover the entire spherical surface 31 in a very short time. This produces the movement of the surface metal in the spherical area and the highly silver luster resulting therefrom. As the angularity of the spherical surface changes on various types of workpieces, the rollers 27 are disposed at different angles to produce the engagement with the spherical surface of different diameters in the same manner as illustrated in FIG. 1.

Figure 2:
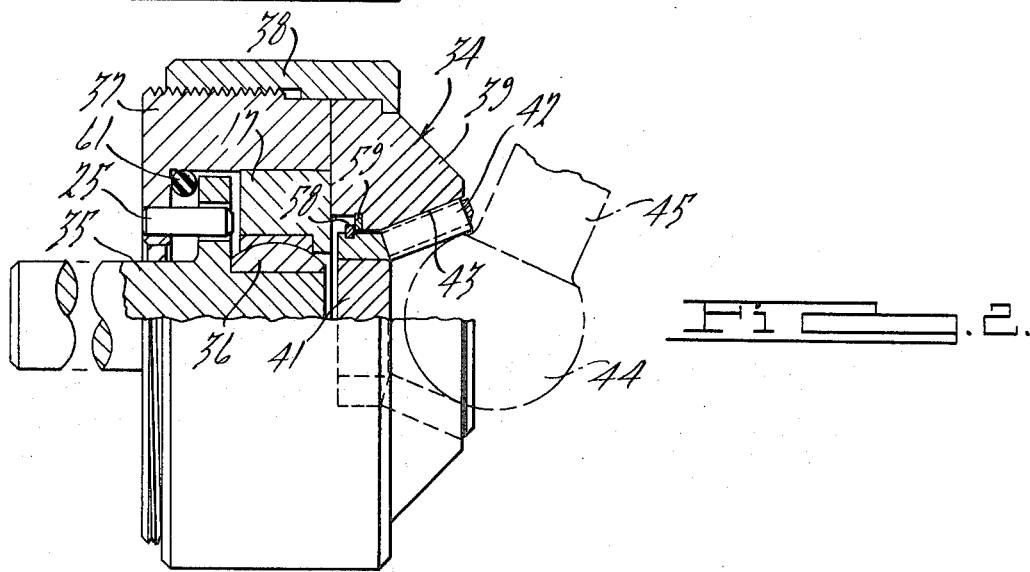
FIG. 2 is a view of structure, similar to that illustrated in FIG. 1, with the rollers disposed on a conical surface of smaller angle to burnish the surface of a ball on a stud.

FIG. 2 discloses a burnishing tool 34 having a spindle 35 and a universal connection 36 with a bushing 17 which is the same as that illustrated in the burnishing tool of FIG. 1 including the use of the driving pin 25. A housing 37 has a retainer 38 threaded thereon for supporting a roller cam 39 within the head. A cage 41 supports a plurality of rollers 42 against the truncated surface 43 of the cam 39 at an angle of approximately 25° to the axis of the spindle 35. The rollers are so positioned as to receive therebetween a ball 44 provided on the end of a stud 45. The support for the burnishing tool and ball stud are driving shanks which support the spindle and stud in angular relation to each other herein illustrated at an angle of approximately 110°. The ball is driven in one direction while the head 34 is driven in the opposite direction and as the point engagement between the rollers and head 44 is continuously applied to the head, the head rotation moves the line produced from the point engagement over the entire ball surface thereby burnishing the surface and producing a bright luster thereon. It will be understood that the sahpe of the cage 41 and the rollers supported thereby will conform to the diameter of the ball 44 when it is larger or smaller.

Figure 3:
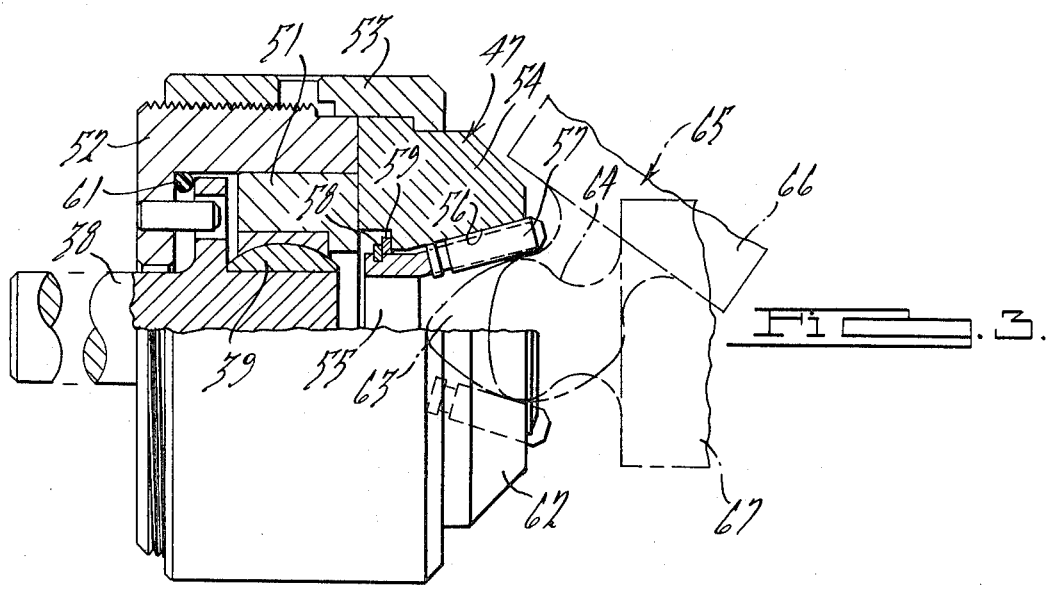
FIG. 3 is a view of structure similar to that illustrated in FIGS. 1 and 2 showing a burnishing tool operating on a workpiece of non-uniform arcuate surface and the angular advancement thereof within the burnisher's rollers.

Referring to FIG. 3, a burnishing tool 47 is similar to the tools 13 and 34 having a spindle 38, a universal joint 39, a bushing 51, a housing 52, a retainer 53 and a roller cam 54. A cage 55 supports a plurality of rollers 57 which engage a truncated conical surface 56 of the roller cam 54. The cage 55 has a split ring 58 in a slot therein which supports a washer 59 for retaining the cage within the roller cam 54. The same pair of rings 58 and 59 are employed on the cage 41 of the burnishing tool illustrated in FIG. 2 for the same purpose. Since the spindles 12, 35 and 38 are movable relative to the supported burnishing heads, an O-ring 61 is provided within the housing 18 adjacent to the edge of a flange 60 on the spindles to retain the axis of the spindle on the axis of the head, to prevent the free movement therebetween and to return the head to its normal position relative to the spindle after being deflected therefrom.

Referring again to FIG. 3, the tapered arcuate element 62 to be burnished has a tapered front end 63 and a recessed rear end 64 which are to be engaged by the rollers 57. The spindle 65, from the end of which the element 62 to be burnished extends, is mounted in a head which rotates the spindle in the direction opposite to that in which the spindle 38 is rotated. Since the element 62 is not a true spherical surface, it is necessary to move the supporting and driving element for the spindle 65 in a manner to have the spindle moved from the position 66 to the position 67. This moves the points of contact between the element 62 and the rollers 57 from one to the other end of the element. This feed movement between the spindles 38 and 65 is in addition to the rotary movements thereof employed on true spherical surfaces, as illustrated in FIGS. 1 and 2.

It will be noted in the three FIGS. 1, 2 and 3 that the rollers 27 to 42 and 56 are of cylindrical form to roll on the truncated conical surface of the roller cams 19, 39 and 54. While some skidding results therefrom between the cam surface and that of the rollers, the hardened metal from which cams and rollers are produced eliminates any substantial wear reducing the cost of the tools from thos requiring tapered rollers.

I claim:

1. In a burnishing device, a rotatable spindle, a head on said spindle having a roller cam surface at the end face of truncated conical shape, a cage of truncated conical shape, rollers supported by said cage in engagement with said roller cam surface, a second spindle disposed in cross axis relation to said first spindle for supporting a workpiece in engagement with said rollers providing point contact at different distances from the axis of said workpiece spindle and means for driving said spindles in rotation in opposite directions.

2. In a burnishing device as recited in claim 1, wherein the workpiece has an arcuate area of large radius to be burnished which has point contact with the rollers at the inner and outer edges on opposite sides of the workpiece.

3. In a burnishing device as recited in claim 1, wherein the rollers on the truncated conical surface are disposed on a small angle for contacting a ball at the end of a stud at points on a line from the ball center to its edge which is spread over the entire ball as the ball is driven in rotation.

4. In a burnishing device as recited in claim 3, wherein the ball tapers to the end and wherein the stud is arcuately swung to have the rollers contact the length of the tapered ball surface.

5. In a burnishing device as recited in claim 1, wherein the spindle has a universal connection with the burnishing head, a flange on said spindle having an aperture, and a pin supported by said head extending in said aperture to produce a drive between the spindle and head.

6. In a burnishing device as recited in claim 5, wherein an O-ring is supported in the head abutting the edge of said spindle flange for preventing free movement of the head on the spindle and for returning the head to its initial position when deflected.

7. In a burnishing device, a spindle, a head, bearing means supporting the head for swinging movement on said spindle, a plurality of burnishing rollers disposed on the surface of a cone at the end of the head, a workpiece having a spherical area to be burnished, a spindle supporting said workpiece in cross axis relation to the axis of the tool spindle providing point contact between the rollers and the surface of the spherical area, and means for driving both said spindles in rotation.

8. In a burnishing device as recited in claim 7, wherein the spindles are driven in opposite directions to spread the point of the roller's engagement over the entire spherical area to produce the burnishing thereof.

9. In a burnishing device as recited in claim 8, wherein one of the spindles is moved angularly in a plane through the axis of the other spindle to provide a forward movement to the workpiece surface being burnished and the point engagement with the rollers.

10. In a burnishing device as recited in claim 1, wherein said rollers are of cylindrical shape.

* * * * *